(12) United States Patent
Mazzagatti (10) Patent No.: US 8,010,569 B2
(45) Date of Patent: Aug. 30, 2011

(54) ADDING AND SUBTRACTING KSTORES

(75) Inventor: Jane C. Mazzagatti, Blue Bell, PA (US)

(73) Assignee: Unisys Corporation, Blue Bell, PA (US)

( * ) Notice: Subject to any disclaimer, the term of this patent is extended or adjusted under 35 U.S.C. 154(b) by 422 days.

(21) Appl. No.: 12/319,030

(22) Filed: Dec. 31, 2008

(65) Prior Publication Data
US 2010/0169372 A1 Jul. 1, 2010

(51) Int. Cl.
*G06F 7/00* (2006.01)
*G06F 17/00* (2006.01)
(52) U.S. Cl. .......................... 707/791; 707/802
(58) Field of Classification Search .................. None
See application file for complete search history.

(56) References Cited

U.S. PATENT DOCUMENTS

| | | | |
|---|---|---|---|
| 6,105,036 A * | 8/2000 | Henckel | 1/1 |
| 6,941,338 B1 * | 9/2005 | Madsen | 709/203 |
| 7,158,975 B2 * | 1/2007 | Mazzagatti | 707/797 |
| 2004/0181547 A1 * | 9/2004 | Mazzagatti | 707/104.1 |
| 2005/0071335 A1 * | 3/2005 | Kadatch | 707/8 |
| 2005/0076011 A1 * | 4/2005 | Mazzagatti | 707/3 |
| 2006/0101018 A1 * | 5/2006 | Mazzagatti et al. | 707/8 |
| 2008/0275842 A1 * | 11/2008 | Mazzagatti et al. | 707/3 |

* cited by examiner

*Primary Examiner* — Kuen S Lu
*Assistant Examiner* — Tuan Pham
(74) *Attorney, Agent, or Firm* — Richard J. Gregson; Robert P. Marley (57) ABSTRACT

The KStore is a datastore made up of a forest of interconnected, highly unconventional trees of one or more levels. One KStore can be added to an existing KStore to create an updated KStore by traversing the trees of the KStores and incrementing the count fields to reflect the added counts of analogous nodes. New KStore structure is added as needed. A KStore can be subtracted from an existing KStore to create an updated KStore by traversing trees KStores and decrementing the count fields in the updated KStore to reflect the subtracted counts of analogous nodes. KStore structure is removed as needed. Portions of a KStore can be added or subtracted from another KStore by isolating the paths to be used for updating. Instead of incrementing or decrementing counts, a dataset of individual records can be recreated from the KStore.

19 Claims, 8 Drawing Sheets

FIG. 1

| Dataset 1 200 | Bill Tuesday 100 sold PA | Bill Monday 100 trial PA |
| | Bill Tuesday 100 sold PA | Bill Monday 100 trial PA |
| | Bill Tuesday 100 sold PA | Tom Monday 100 sold PA |
| | Bill Tuesday 100 sold PA | Tom Monday 100 sold Pa |
| | Bill Tuesday 100 sold PA | Tom Monday 103 trial NJ |
| | Bill Tuesday 100 sold PA | Tom Monday 103 trial NJ |
| | Bill Monday 103 sold NJ | Tom Monday 103 trial NJ |
| | Bill Monday 100 trial PA | |

Dataset 2 400
Bill Wednesday 103 sold PA
Bill Wednesday 103 sold PA
Bill Tuesday 100 sold PA
Tom Wednesday 103 sold NJ

ADDING AND SUBTRACTING KSTORES

RELATED APPLICATIONS

This application claims the benefit of U.S. patent application Ser. No. 11/084,996, filed Mar. 18, 2005, entitled "SYSTEM AND METHOD FOR STORING AND ACCESSING DATA IN AN INTERLOCKING TREES DATASTORE" by MAZZAGATTI et al. which application is a Continuation of U.S. patent application Ser. No. 10/385,421, filed Mar. 10, 2003 and U.S. patent application Ser. No. 11/185,620, filed Jul. 20, 2005, entitled "METHOD FOR PROCESSING NEW SEQUENCES BEING RECORDED INTO AN INTERLOCKING TREES DATASTORE," by MAZZAGATTI. These applications are incorporated in their entirety herein.

TECHNICAL FIELD

The present disclosure relates to data processing systems, and datastores to such systems. In particular, the present disclosure relates to data node types related to an interlocking trees datastore.

BACKGROUND

Data structures facilitate the organization and referencing of data. Many different types of data structures are known in the art, including linked lists, stacks, trees, arrays and others. The tree is a widely-used hierarchical data structure of linked nodes. The conventional tree is an acyclic connected graph where each node has a set of zero or more child nodes and at most one parent node. A tree data structure, unlike its natural namesake, grows down instead of up, so that by convention, a child node is typically referred to as existing "below" its parent. A node that has a child is called the child's parent node (or ancestor node, or superior node). In a conventional tree, a node has at most one parent. The topmost node in a tree is called the root node. A conventional tree has at most one topmost root node. Being the topmost node, the root node does not have a parent. Operations performed on the tree commonly begin at the root node. All other nodes in the tree can be reached from the root node by following links between the nodes. Nodes at the bottommost level of the tree are called leaf nodes or terminal nodes. As a leaf node is at the bottommost level, a leaf node does not have any children.

SUMMARY

The KStore or K is a datastore made up of a forest of interconnected, highly unconventional trees of one or more levels. Each node in the KStore can have many parent nodes. The KStore is capable of handling very large amounts of highly accessible data without indexing or creation of tables. Aspects of KStore are the subject of a number of patents including U.S. Pat. Nos. 6,961,733, 7,158,975, 7,213,041, 7,340,471, 7,348,980, 7,389,301, 7,409,389, 7,418,455 and 7,424,480, which are hereby incorporated by reference in their entirety.

A KStore can be added to an existing KStore to create an updated KStore by traversing the asCase trees of the existing KStore and the KStore to be added and incrementing the count fields in the updated KStore to reflect the added counts of analogous nodes in the existing KStore and the KStore to be added. New KStore structure is added (i.e., nodes in a path are added) as needed to the updated KStore to add those portions of the KStore to be added that do not already exist in the existing KStore. A KStore can be subtracted from an existing KStore to create an updated KStore by traversing the asCase trees of the existing KStore and the KStore to be subtracted and decrementing the count fields in the updated KStore to reflect the subtracted counts of analogous nodes in the existing KStore and the KStore to be subtracted. KStore structure may be removed (i.e., nodes in a path may be removed) as needed from the updated KStore if as a result of count subtraction, counts become zero or less than zero. Alternatively, the structure may be retained to provide historical information.

A portion of a first KStore can be added to a second KStore to create a third KStore by isolating one or more paths or portions of paths by traversing the path to its end point, saving the count, traversing the path back to the primary root node and adding counts of analogous nodes in the KStores. A portion of a first KStore can be subtracted from a second KStore to create a third KStore by isolating one or more paths or portions of paths by traversing the path to its end point, saving the count, traversing the path back to the primary root node and subtracting counts of analogous nodes in the KStores. A dataset can be recreated, record by record and sent to the KStore to be updated one by one.

DETAILED DESCRIPTION

Overview of KStore Data Structure

Figure 1:
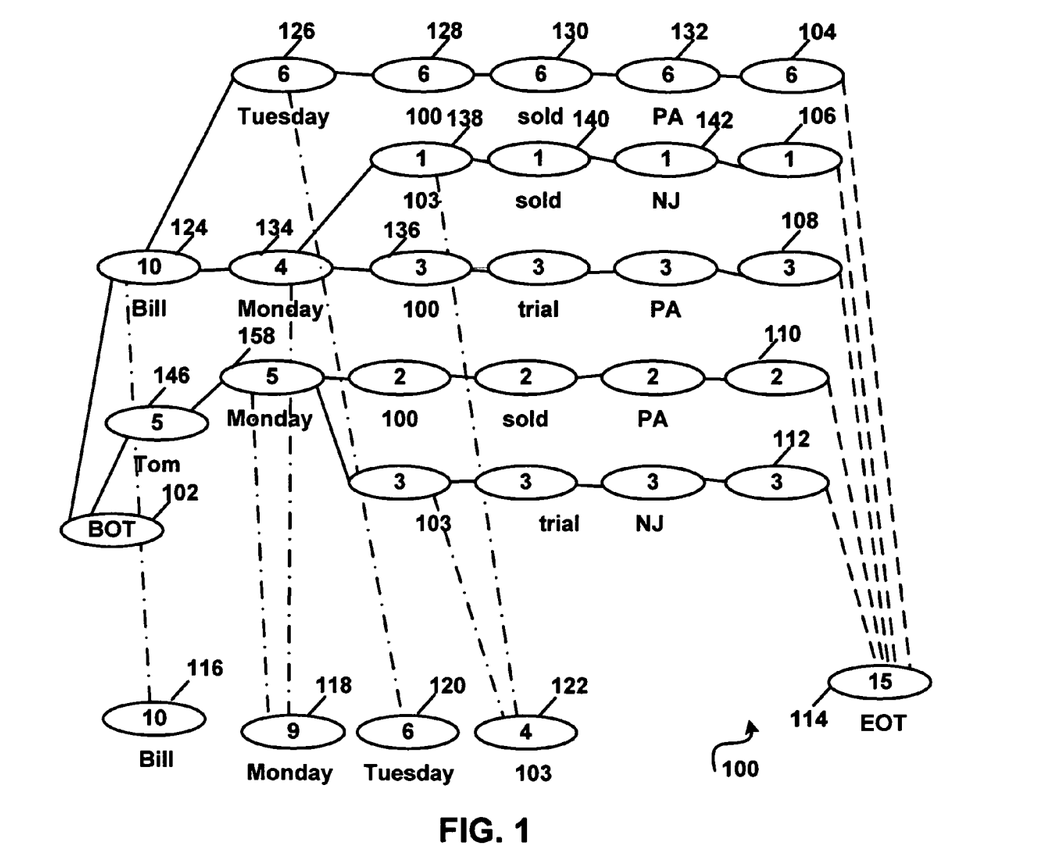
FIG. 1 is a block diagram illustrating an example of an interlocking trees datastore (KStore or K) in accordance with aspects of the subject matter disclosed herein.
Figure 2:
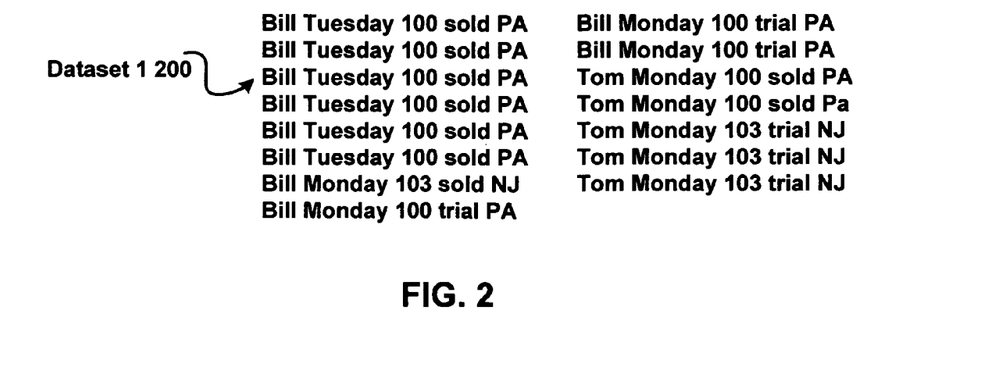
FIG. 2 is an example of a dataset from which the KStore of FIG. 1 was generated in accordance with aspects of the subject matter disclosed herein.
Figure 10:
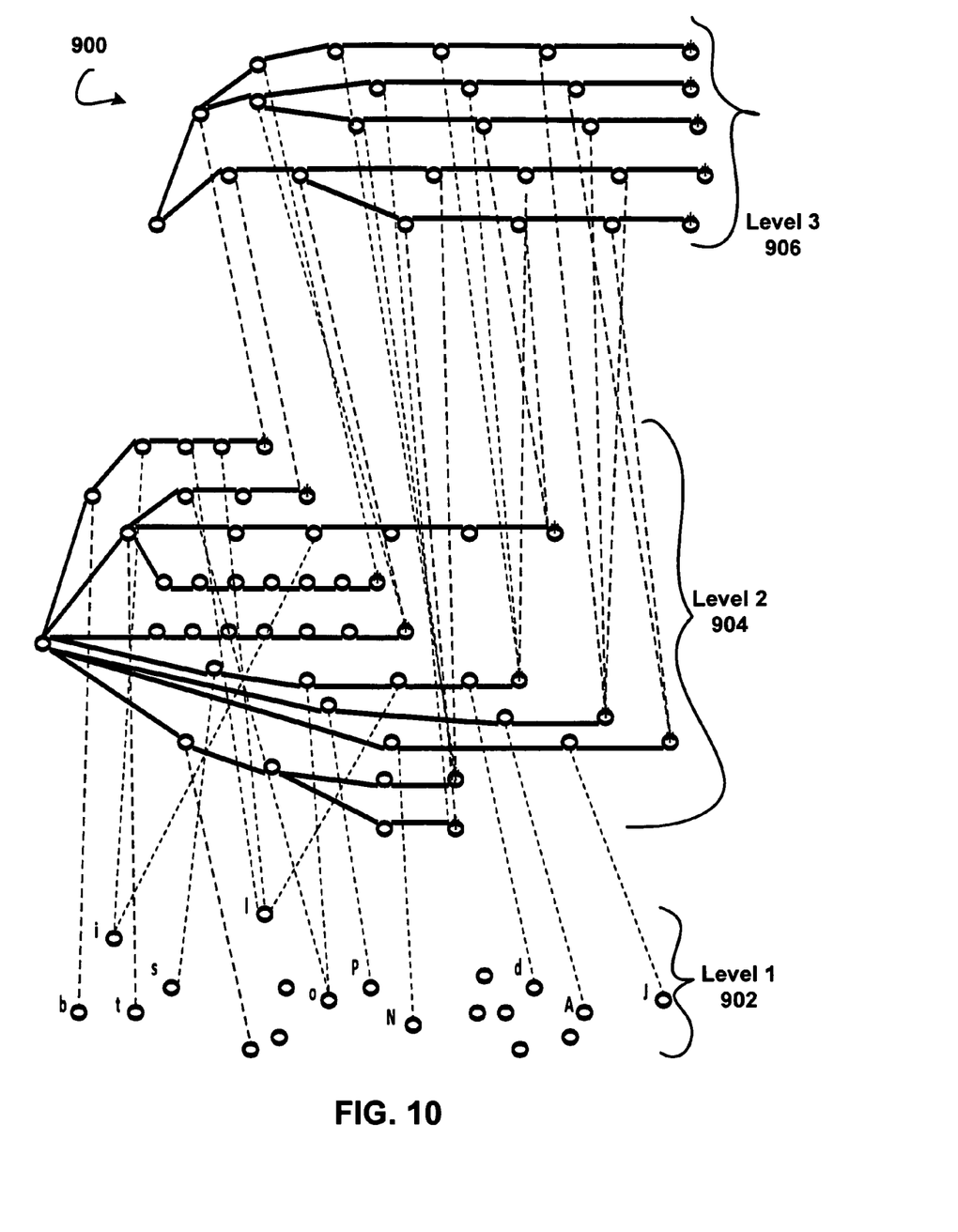
FIG. 10 illustrates an example of levels in a KStore in accordance with aspects of the subject matter disclosed herein.

A KStore or K is a datastore made up of a forest of interconnected trees. FIG. 10 illustrates a multi-level KStore structure 900 created from the data in Dataset 1 200 of FIG. 2. The highest level (level 3) 906 of the KStore 900 represents the KStore 100 illustrated in FIG. 1 and represents records (e.g., Tom-Monday-103-trial-NJ). The middle level (level 2) 904 represents the field content or variables (the root nodes of KStore 100) which make up the records of level 3 906 (e.g., the variable Tom, the variable Tuesday, etc.) and the lowest level (level 1) 902 represents the universe of dataset elements that are combined to make up the variables (e.g., the letter T, the letter o, the number 1, the number 0 and so on). It will be appreciated that multi-level KStores of any number of levels can exist. Additional levels can be added or removed at any time, and existing levels can be updated at any time. For example, an additional level (level 4, not shown) representing datasets (of which Dataset 1 200 of FIG. 2 is one dataset) can be added above level 3 906. Additional records can be added to level 3 906. Additional variables can be added to level 2 904. Additional dataset elements (e.g., the letter v) can be added to level 1 902. Moreover, updates to one level of the KStore are propagated to other levels as required. For example, the addition of a record for Violet-Tuesday-100-sold-NY, would be reflected in all the levels of the KStore. The record would be added to level 3 906, the variables of level 2 904 would be updated to include the new variables Violet and NY and the list of elemental root nodes of the lowest level, level 902 of FIG. 9 would be updated to include elemental root nodes for V and Y.

The interlocking trees datastore comprises a first tree that depends from a first root node (a primary root node) and may include a plurality of branches. Each of the branches of the first tree ends in a leaf node called an end product node. The first root node may represent a concept, such as but not limited to a level begin indicator (e.g., BOT or Beginning of Thought). For example, referring to FIG. 1, KStore 100 includes a first tree depending from a first root node 102 and including 5 branches (e.g. the topmost branch is comprised of nodes 102, 124, 128, 130, 132 ending with the leaf node 104.

A second root (e.g., root node 114) of the same level of the same trees-based datastore is linked to each leaf node of the first tree (e.g., to nodes 104, 106, 108, 110 and 112) and is called an EOT (End Of Thought) node. Leaf nodes of a KStore are also called end product nodes. End product nodes include a count that reflects the number of times the sequence of nodes from BOT to EOT has occurred for the unique sequence of nodes that end with that particular end product node. For example, node 106 with a count of 1 reflects the counts associated with the path connecting nodes 102, 124, 134, 138, 140 and 142. The second root (e.g., root node 114) is a root to an inverted order of the first tree or to an inverted order of some subset of the first tree, but does not duplicate the first tree. Node 134 is a node that is shared by the KStore path that ends with end product node 106 and by the KStore path that ends with end product node 108. Thus the count of node 134 (4) is the combination of the count of node 106 (1) and the count of node 108 (3).

Finally, the trees-based datastore comprises a plurality of trees of a third type in which the root node of each of these trees can be described as an end product node of an immediately adjacent lower level or as an elemental root node and may include or point to data such as a dataset element or a representation of a dataset element. The root nodes 116, 118, 120 and 122 are end product nodes of the immediately adjacent lower level of the KStore. It will be appreciated that not all of the root nodes of KStore 100 are illustrated in FIG. 1 to avoid unduly cluttering the Figure. The root node of each of these trees may be linked to one or more nodes in one or more branches of the unduplicated first tree. The nodes of the trees-based datastore may contain pointers to other nodes in the trees-based datastore instead of data per se, and may also contain additional fields. One such additional field may be a count field (e.g., the count field of node 120 is 6 and the count field of node 108 is 3). Multiple levels of the above-described tree-based datastore may be generated and accessed, the end products of the lower level becoming the root nodes of the next level.

Branches of the first tree are called asCase branches or asCase paths. AsCase paths are linked via asCase links denoted by solid lines in the Figures. Together, all the asCase paths of a KStore form the asCase tree of that level. The asCase tree depends from a first root (the primary root, e.g., node 102 in FIG. 1). Multiple asResult branches or asResult paths form multiple asResult trees that depend from respective multiple roots. AsResult paths are linked via asResult links denoted by hashed lines (-.-.- or - - -) in the Figures. For example, in FIG. 1 a number of asResult trees are illustrated including the asResult tree comprised of root node 116 representing the dataset element Bill and internal node 124 having a count field of 10 (ten) representing that 10 records of the dataset that resulted in the creation of the KStore of FIG. 1 had a value of Bill in a particular field. Another asResult tree illustrated in FIG. 1 is the asResult tree comprised of the following nodes: root node 118 representing the dataset element Monday, which is linked by asResult links to node 134 and to node 158. The count of root node 118 is 9, the sum of the counts of node 134 (4) and node 158 (5). The count 9 indicates that 9 records of the dataset that resulted in the creation of the KStore of FIG. 1 had a value of Monday in a particular field. One instance of an asResult tree comprises the asResult tree whose root node is node 114. This root node, node 114 in FIG. 1, is linked to each end product node (e.g., nodes 104, 106, 108, 110 and 112). This asResult tree can access the branches of the asCase tree terminating in end products in inverted order. This asResult tree can also be used to define root nodes for the next level. These root nodes may represent dataset elements for the next adjacent level, composed of the set of end products of the lower adjacent level.

The interlocking trees datastore may capture information about relationships between dataset elements encountered in an input file by combining a node that represents a level begin indicator (e.g., BOT) with a node that represents a dataset element to form a node representing a subcomponent. A subcomponent node may be combined with a node representing a dataset element to generate another subcomponent node in an iterative sub-process. Combining a subcomponent node with a node representing a level end indicator may create a level end product node. The process of combining a level begin node with a dataset element node to create a subcomponent and combining a subcomponent with a dataset element node and so on may itself be iterated to generate multiple asCase branches in a level. AsResult trees may also be linked or connected to nodes in the asCase tree, such as, for example, by a root node of an asResult tree pointing to one or more nodes in the asCase tree.

Figure 8:
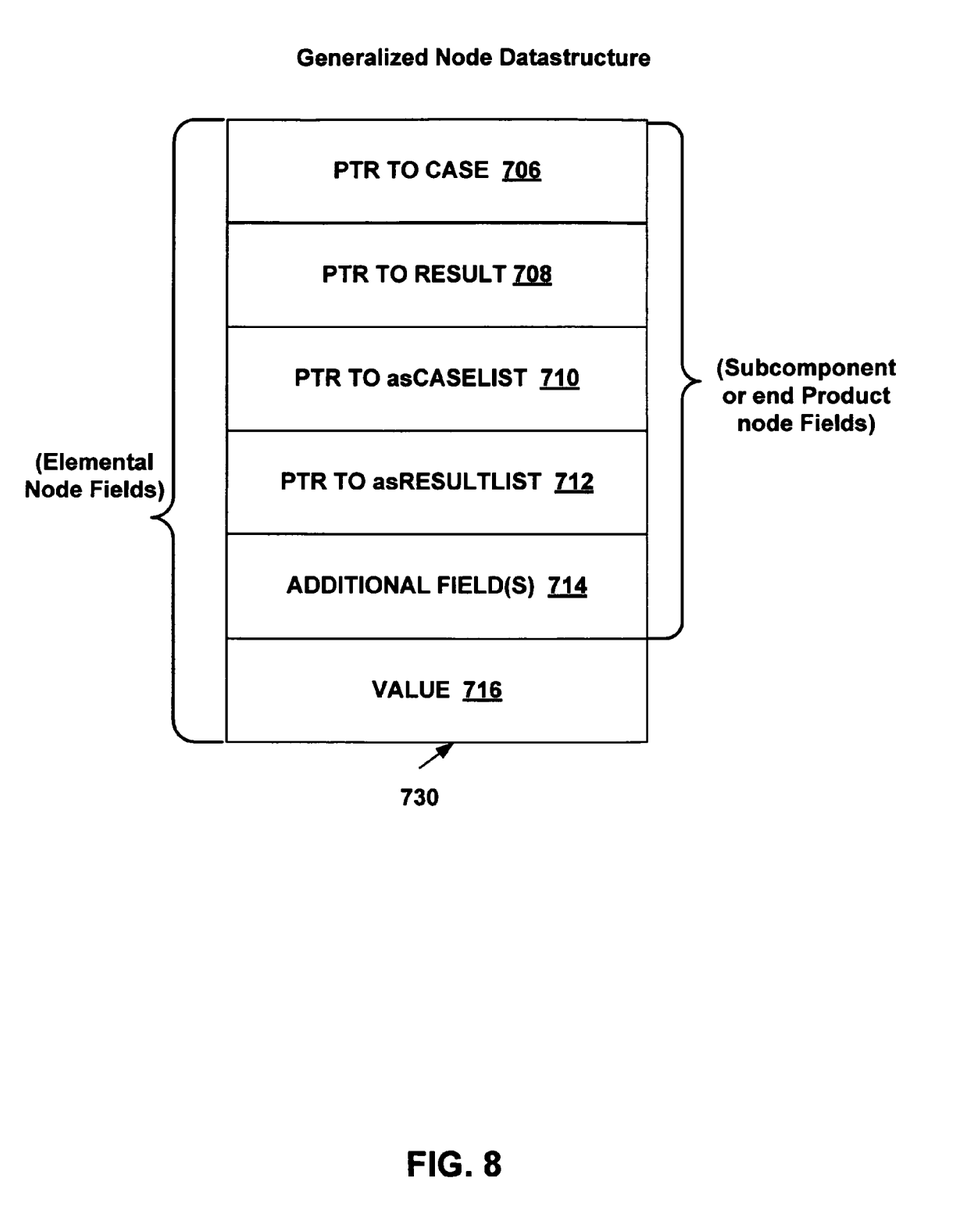
FIG. 8 illustrates a generalized node data structure of a KStore data structure in accordance with embodiments of the invention.

FIG. 8 illustrates the data fields of a typical node, e.g., node 730 of the interlocking trees data structure. Node 730 can represent an elemental root node, subcomponent node or end product node. When a new node is built in an interlocking datastore, memory is allocated for the new node as shown in FIG. 8. A plurality of pointers can then be stored in the allocated memory. The new node is defined by setting the asCase pointer (pointer to Case) 706 to point to the previous node in the path and setting the asResult pointer (pointer to Result) 708 to point to the elemental root node. Thus, for example, if node 730 represents the subcomponent node 124 of the interlocking trees datastore shown in FIG. 1, the asCase pointer 706 would point to the BOT node, node 102 and the asResult pointer 708 would point to the Bill elemental root node, node 116. The pointer to asCaseList 710 is a pointer to a list of the subcomponent nodes or end product nodes for which the node represented by the node 730 is the asCase node. For example, the asCaseList for node 134 would include pointers to nodes 136 and 138. It will be appreciated that the pointer to asCaseList, field 710 will be null for the elemental nodes and for end product nodes. The pointer to asResultList 712 is a pointer to a list of the subcomponents nodes or end product nodes for which the node represented by the exemplary node 730 is the asResult node. For example, the asResultList for node 124 would be empty. It will be appreciated that the pointer to asResultList field 712 will be null for all subcomponent nodes. The asResultList of root node 118 will (Monday) include pointers to nodes 158 and 134. The asResultList of end product nodes 104, 106, 108, 110 and 112 will include pointers to subcomponents of the next adjacent upper level of the KStore 100 (not shown). The asResultList of root node 118 (Monday) includes pointers to nodes 158 and 134. The nodes of the interlocking trees datastore can also include one or more additional fields 714. The additional fields 714 may be used for an intensity or count associated with the node. A count may be incremented or decremented to record the number of times that a node has been accessed or traversed or to record the number of times it was encountered or received in an input dataset. The additional fields 714 may be used for a list of all the elemental root nodes represented by the node or for any number of different items associated with the structure. Another example of a parameter that can be stored in an additional field 716 is the particle value representing a dataset element for an elemental root node. If the node is an elemental root node it may also include a value field 716, comprising the dataset element it represents.

As nodes are created, asCase and asResult links may be simultaneously generated at each level and asCaseLists and asResultLists may be generated and updated. As described above, an asCase link represents a link to the first of the two nodes from which a node is created. For example, referring to FIG. 1, the asCase link of node 124 points to node BOT 102. It will be appreciated that asCase branches of the asCase trees may be created by generation of the asCase links as the input is processed. The asCase branches of each level thus provide a direct record of how each subcomponent and end product of the level was created. Hence the asCase branches can be used to represent one possible hierarchical relationship of nodes in the asCase tree. For example if the data received by an interlocking trees generator is data concerning salesmen who sell products identified by product numbers in states of the United States, a particular input dataset may include the two records:

| Tom | sold | 100 | PA |
| Bill | sold | 40 | NJ | where Tom and Bill are salesmen, 100 and 40 are product numbers and PA and NJ are states in which the salesmen sold their products. The asCase tree generated from this input may comprise a view of the data in the context of "state information with the context of salesman" context.

An asResult link represents a link to the second of the two nodes from which a node is created. For example, the asResult link of node 124 points to node 116 (Bill). The generation of the asResult links creates a series of interlocking trees where each of the asResult trees depends from a root comprising a dataset element. This has the result of recording all encountered relationships between the root nodes and the nodes of the asCase trees in the KStore. That is, the asResult trees capture all the possible contexts of the nodes of the interlocking trees. If, for example, the input to the interlocking trees datastore generator comprises a universe of sales data including salesman name, day of the week, product number and state, the resulting asResult links of the generated interlocking trees datastore could be used to extract information such as: "What salesmen sell in state X", "How many items were sold on Monday?" "How many items did Salesman Bill sell on Monday and Tuesday?" and the like, all from the same interlocking trees datastore, without creating multiple copies of the datastore, and without creating indexes or tables.

It will be appreciated that this information is determinable from the structure of the interlocking trees datastore itself rather than from information explicitly stored in the nodes of the structure. Paths can be traversed backwards towards the root node to determine if the subcomponent or end product belongs to a particular category or class of data. Links between nodes may be bi-directional. For example, a root node for the dataset element "Monday" (e.g. root node 118) may include a pointer to a subcomponent BOT-Bill-Monday (e.g., node 134) in node 118's asResultList while the node BOT-Bill-Monday, node 134 may include a pointer to the node Monday, node 118, as its asResult pointer and so on. Furthermore, by following asCase links of the nodes containing a desired dataset element, other subcomponents and end products containing the desired dataset element can be found along the branch of the asCase tree. It will be appreciated that the described features cause the datastore to be self-organizing.

Adding and Subtracting KStores

Figure 9:
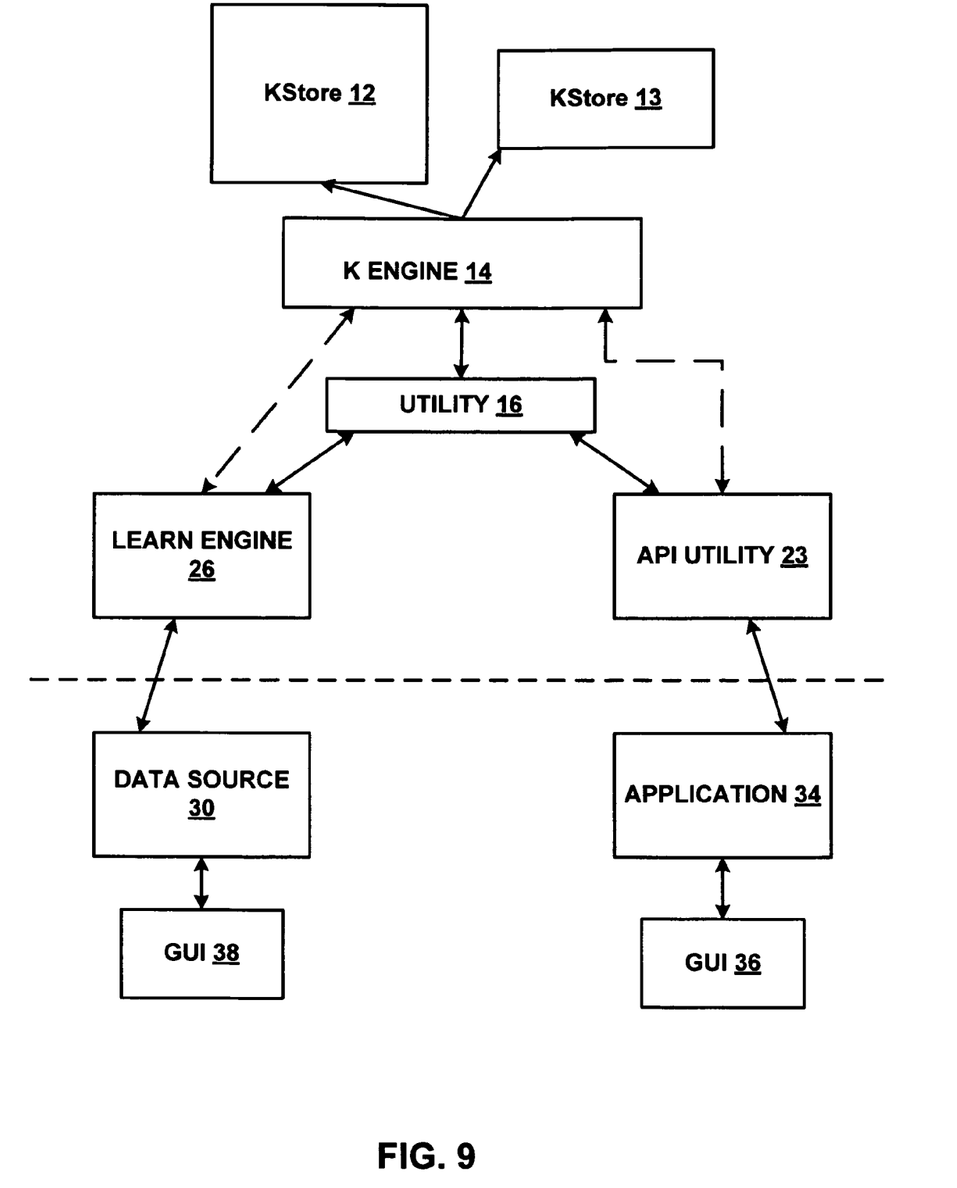
FIG. 9 illustrates an example of a system environment in which aspects of the subject matter disclosed herein can be practiced.

FIG. 9 illustrates an example of a KStore computing environment in which adding and subtracting of KStores may be implemented. The computing environment may include one or more networked or unnetworked computers capable of implementing and processing KStores on which one or more of the following reside: a KStore or K Engine 14, one or more KStores such as KStore 12 and KStore 13, a Learn Engine 26, one or more data sources 30, a utility 16, an application programming interface (API) utility 23, one or more graphical user interfaces (e.g., GUI 38, GUI 36) and one or more applications such as application 34. One or more of: K Engine 14, Learn Engine 26, utility 16, application programming interface (API) 23, graphical user interfaces (e.g., GUI 38, GUI 36) and application 34 may be executed by the processor of a KStore computer.

The Learn Engine 26 may receive data from many types of input data sources and may transform the received data to particles suitable to the task to which the KStore being built will perform. For example, if the data being sent to the KStore is information from a field/record type database, particular field names may be kept, changed, or discarded, depending on the overall design of the KStore the user is creating. After breaking down the input into appropriate particles, the Learn Engine 26 may make appropriate calls to the K Engine 14 and pass the data in particle form in a way that enables the K Engine 14 to put it into the KStore structure.

API utilities such as API utility 23 receive inquiries and transform the received inquiries into calls to the K Engine, to access the KStore directly or to update associated memory. In the event that a query is not to be recorded in the structure of a KStore a LEARN SWITCH may be turned off. In the event that a query is to be recorded in the structure of the KStore, (as in Artificial Intelligence applications, for example) the LEARN SWITCH may be turned on. API utilities may get information from the KStore using predefined pointers that are set up when the KStore is built (rather than by transforming the input into particles and sending the particles to the K Engine). For instance, a field may point to the Record End of Thought (EOT) node, the Field EOT node, the Column EOT node and the Beginning Of Thought (BOT) node. This field may be associated with the K Engine, and may allow the K Engine to traverse the KStore using the pointers in the field without requiring the API Utility to track this pointer information.

Within the KStore computing environment information may flow bi-directionally between the KStore or KStores, a data source 30 and an application 34 by way of a K Engine 14. The transmission of information between the data source 30 and the K Engine 14 may be by way of a learn engine 26, and the transmission of information between the application 34 and the K Engine 14 may be by way of an API or API utility engine 23. A call including directives concerning addition or subtraction of KStores or partial KStores may be made to API utility 23. Data source 30 and application 34 may be provided with graphical user interfaces 36, 38 to permit a user to communicate with the system.

Objects or other types of system components such as learn engine 26 and the API utility engine 23 may be provided to service learn and query threads so that applications and interfaces of any kind can address, build and use the KStore(s). Learn engine 26 may provide an ability to receive or get data in various forms from various sources on the same computer or on different computers connected via a network and to turn it into input particles that the K Engine 14 can use. The API Utility engine may provide for appropriate processing of inquiries received by application software of any kind. The API utility engine 23 and the learn engine 26 get information from and/or put information into a KStore. It will be understood by those of skill in the computer arts that software objects can be constructed that will configure the computer system to run in a manner so as to implement the attributes of the objects. It is also understood that the components described above may be created in hardware as well as software.

As described above, FIG. 1 represents the top level of a KStore generated from Dataset 1 200 illustrated in FIG. 2. For example, Dataset 1 200 includes a set of six instances of the record Bill Tuesday 100 sold PA. Hence the count for the nodes 126 (Tuesday), 128 (100), 130 (sold), 132 (PA) and node 104 (a count of the number of the Bill Tuesday 100 sold PA records) are all 6. Similarly, there is only one record for Bill Monday 100 sold PA thus the counts for nodes 138 (100), 140 (sold), 142 (NJ) and 106 are all 1. The count for node 124 (Bill) is 10 because there are 10 records in Dataset 1 200 that have Bill in the first field of the record. Similarly the count of node 146 (Tom) is 5 because there are 5 records in Dataset 1 200 that have Tom in the first field of the record.

Figure 3:
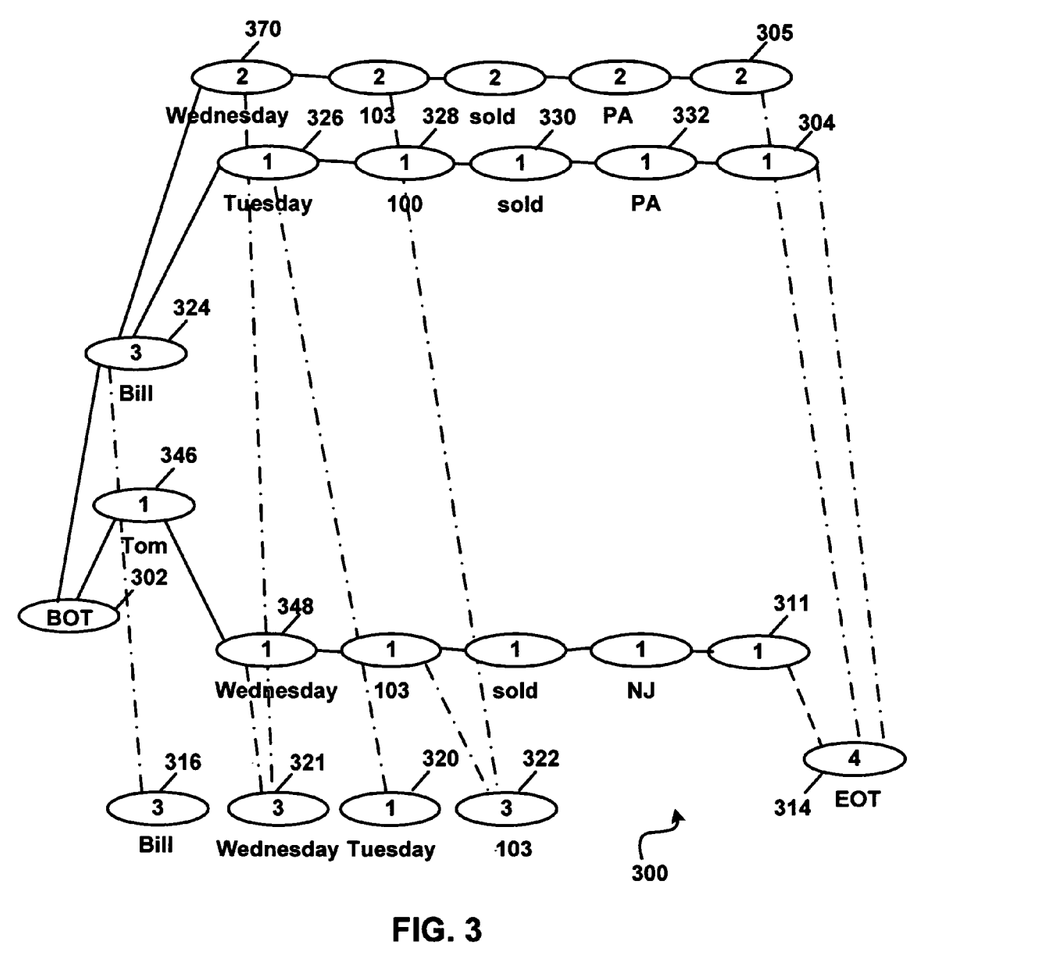
FIG. 3 is a block diagram illustrating another example of an interlocking trees datastore (KStore or K) in accordance with aspects of the subject matter disclosed herein.
Figure 4:
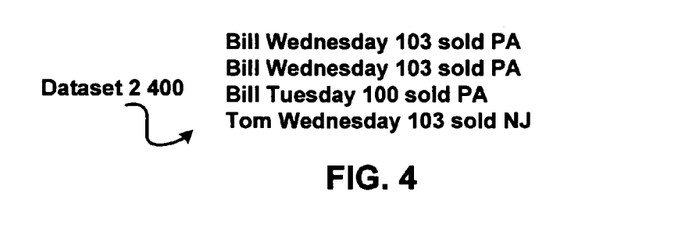
FIG. 4 is an example of a dataset from which the KStore of FIG. 3 was generated in accordance with aspects of the subject matter disclosed herein.

Similarly, FIG. 3 illustrates the top level of a KStore generated from Dataset 2 400 illustrated in FIG. 4. To add KStore 300 to KStore 100, KStore 300 is traversed starting at node 302 (BOT) by following the asCaseList pointers of node 302. The first pointer in node 302's asCaseList points to node 346 (Tom). The count for node 346 (1) is thus added to the count (5) for the analogous node in KStore 100, node 146 (Tom), yielding the count of 6 in node 546 (Tom) in KStore 500 of FIG. 5. The asCaseList pointer for node 346 points to the next node along the asCase path, node 348 (Wednesday). Because there is no existing Wednesday node for Tom in KStore 100, a new node is generated in KStore 500, node 548. The rest of the path Tom-Wednesday-103-sold-NJ-node 311 is traversed using asCaseList links, resulting in the addition of nodes 550, 552, 556 and 511 to KStore 500. After completion of the processing for the Tom-Wednesday-103-sold-NJ-node 311 path of KStore 300, the next entry in node 346's asCaseList would be processed, if any. As there are no other branches beginning from node 346, Tom, the next asCaseList entry for the node 302, BOT, is processed. The next pointer in the asCaseList for node 302 BOT, points to node 324 (Bill). Hence the count (3) for node 324 is added to the count (10) for the analogous node in KStore 100, node 124 (Bill), resulting in count for node 524 (Bill) to be set to 13. Similarly, counts are updated in KStore 500 for the nodes analogous to nodes 326, 328, 330, 332 and 304 in KStore 100, yielding counts of 7 for nodes 526, 528, 530, 532 and 504 in KStore 500. This process is repeated for the rest of the KStore 300 structure, resulting in the creation of the KStore 500.

Figure 6:
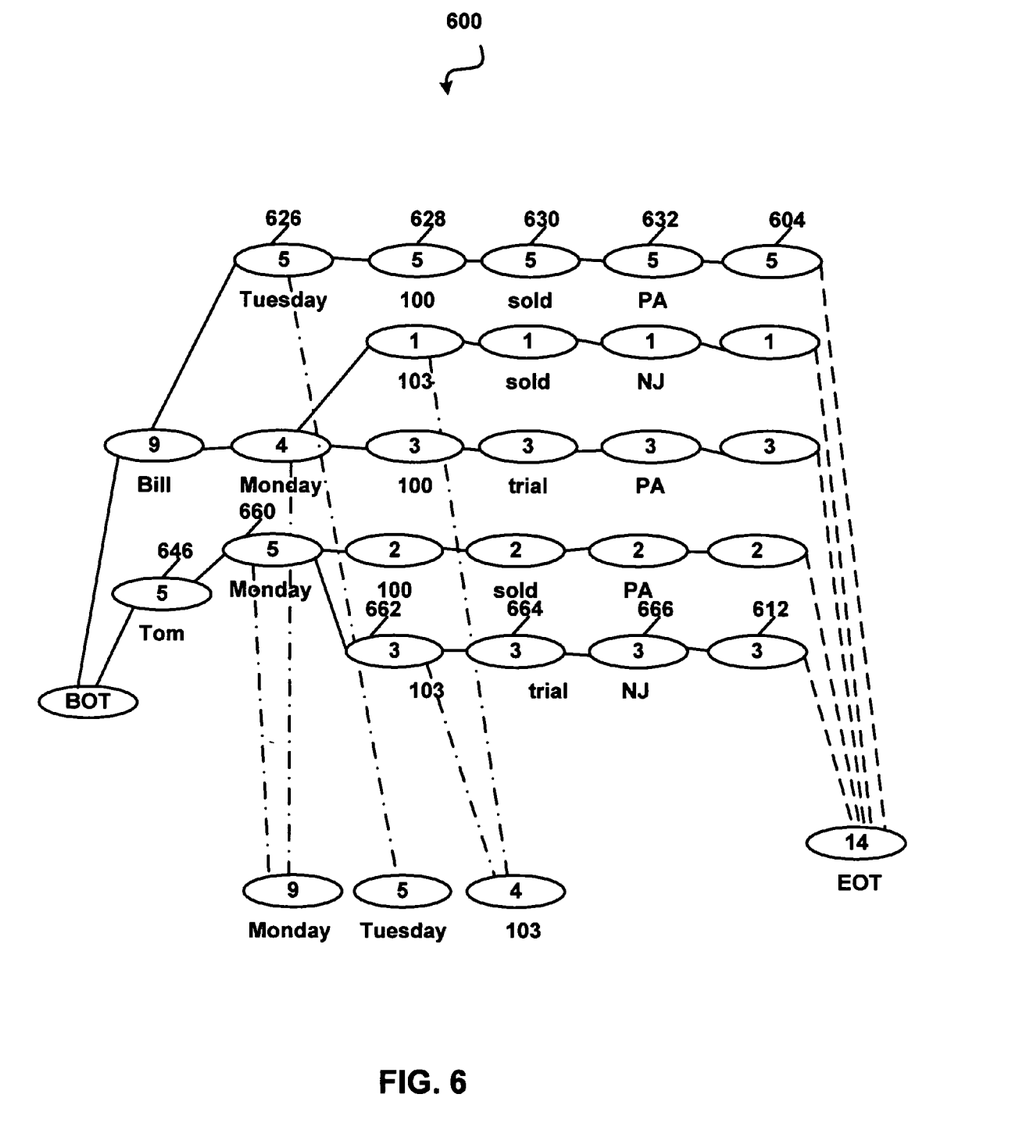
FIG. 6 is a block diagram illustrating another example of an interlocking trees datastore (KStore or K) resulting from a subtraction or removal of a KStore in accordance with aspects of the subject matter disclosed herein.

A similar process can be followed when subtracting KStores. For example, to subtract KStore 300 from KStore 100, the branches of KStore 300 are traversed using the asCaseList links starting from the BOT node, node 302. Counts of nodes of KStore 300 are subtracted from the counts of analogous nodes in the existing KStore, KStore 100 to create the updated KStore, KStore 600 of FIG. 6. For example, the count (1) of node 346 Tom is subtracted from the count (5) of node 146 of KStore 100 to result in the count of 4 for node 646 of KStore 600. Processing the Tom-Wednesday branch of KStore 300 has no effect because there is no Tom-Wednesday branch in KStore 100. Should counts in KStore 600 reach zero or become negative as a result of the subtraction of a KStore, a branch may be removed from the KStore. For example, if a branch in KStore 300 to be subtracted from KStore 100 included BOT-Tom (count=3)–Monday (count=3)–103(count=3)–trial(count=3)–NJ(count=3)–end product node(count=3), the branch represented by nodes 662, 664, 666 and 612 would be removed and the count of nodes 646 and 660 would be reduced by 3 to 2 and 2 respectively.

Figure 5:
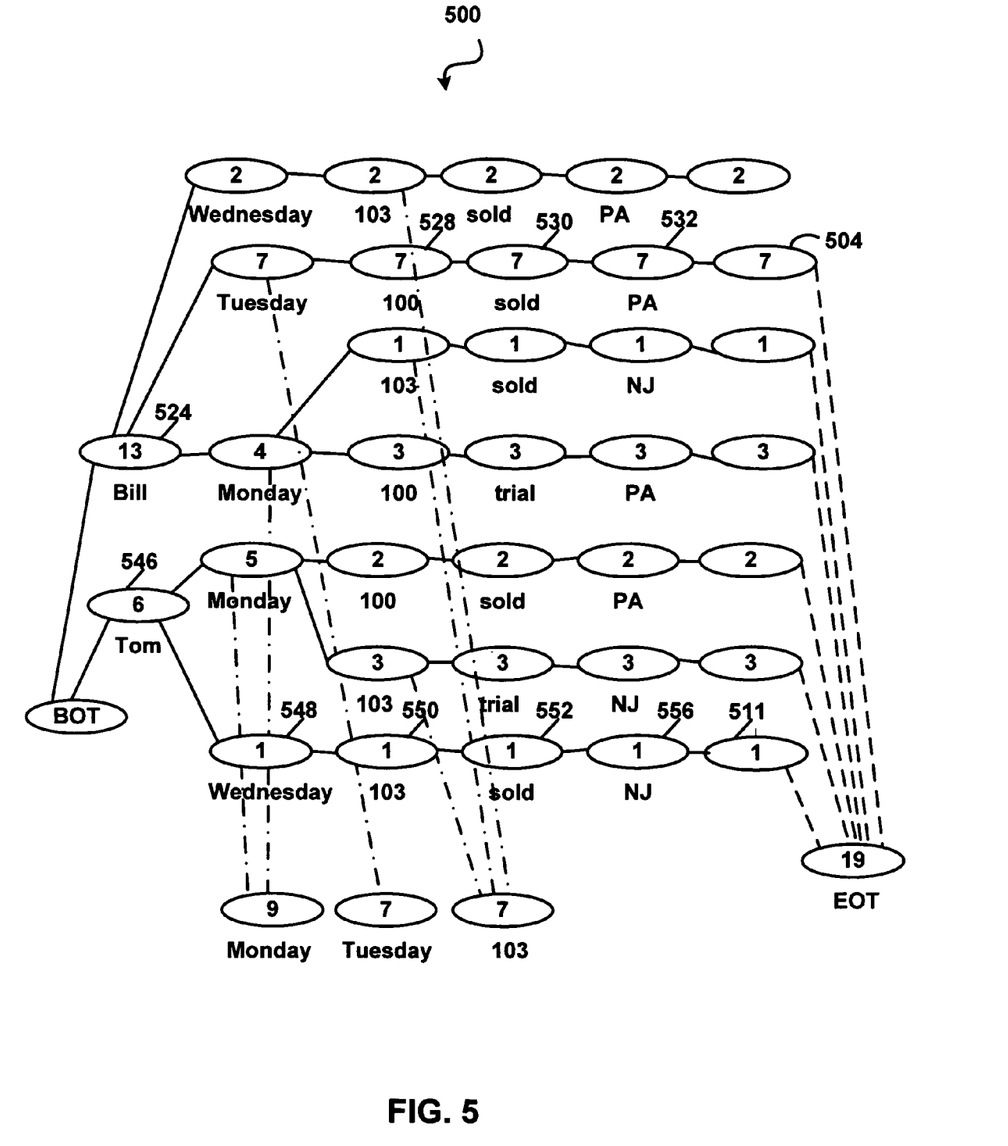
FIG. 5 is a block diagram illustrating another example of an interlocking trees datastore (KStore or K) resulting from an addition of a KStore in accordance with aspects of the subject matter disclosed herein.

To add or subtract a portion of a KStore the appropriate asResult tree may be used to isolate the desired branches of the KStore to be added or subtracted. For example, to add only the Bill branches of KStore 300 to KStore 100, Bill records may be isolated using the Bill asResult tree (following the asResultList pointer of root node 316 to node 324 Bill and following the asCaseList pointers from node 324 Bill to node 326 through node 304 and from node 324 Bill to node 370 and following the asCase links from node 370 to node 305, updating the counts of analogous nodes in KStore 500 and adding structure as needed. Similarly, to subtract only the Bill branches of KStore 300 from KStore 100, Bill records may be isolated using the Bill asResult tree (following the asResultList pointers of root node 316 to node 324 Bill and following the asCaseList pointers of node 324 Bill to node 326 and so on through node 304 and from node 324 Bill to node 370 and following the asCaseList pointers of node 370 and so on to node 305, updating the counts of analogous nodes in KStore 500 and deleting structure as needed. It will be appreciated that the updating KStore, the existing KStore and the updated KStore may represent different states of the same KStore as it changes through the updating process. For example, a KStore may be updated by deleting all the records in the KStore associated with a particular year (e.g., for 2008) by constraining the records to be removed, (e.g., by isolating the 2008 records to be removed) and reducing the count of the end product nodes for the selected records by the number (count) of isolated (2008) records).

It will be appreciated the branch to be added or subtracted may be traversed to the end product node to determine counts, if counts are not maintained at each node. Moreover, the branch may be traversed back to the BOT node to determine which node is analogous in the KStore to be updated (e.g., to determine when subtracting Bill-Tuesday path nodes accessed via a Tuesday asResult tree that the node indicated in the Tuesday asResultList belongs to Bill and not Tom).

In accordance with other aspects of the subject matter disclosed herein, instead of updating counts, a dataset such as dataset 1 200 or dataset 2 400 may be recreated and sent record by record to the KStore to be updated. Records can be recreated by isolating the portion of the KStore to be added or subtracted, if a partial KStore is to be added or subtracted, as described above. One record at a time can be created by determining the counts and creating that number of records. For example, if a count for a sequence of nodes is one, one record is created, if a count for a sequence of nodes is 3, 3 records are created. Records may be created by traversing the path to the end product node to determine the count, traversing backwards to the BOT node and then traversing each path back towards the end product node, generating records as the path is traversed.

Figure 7:
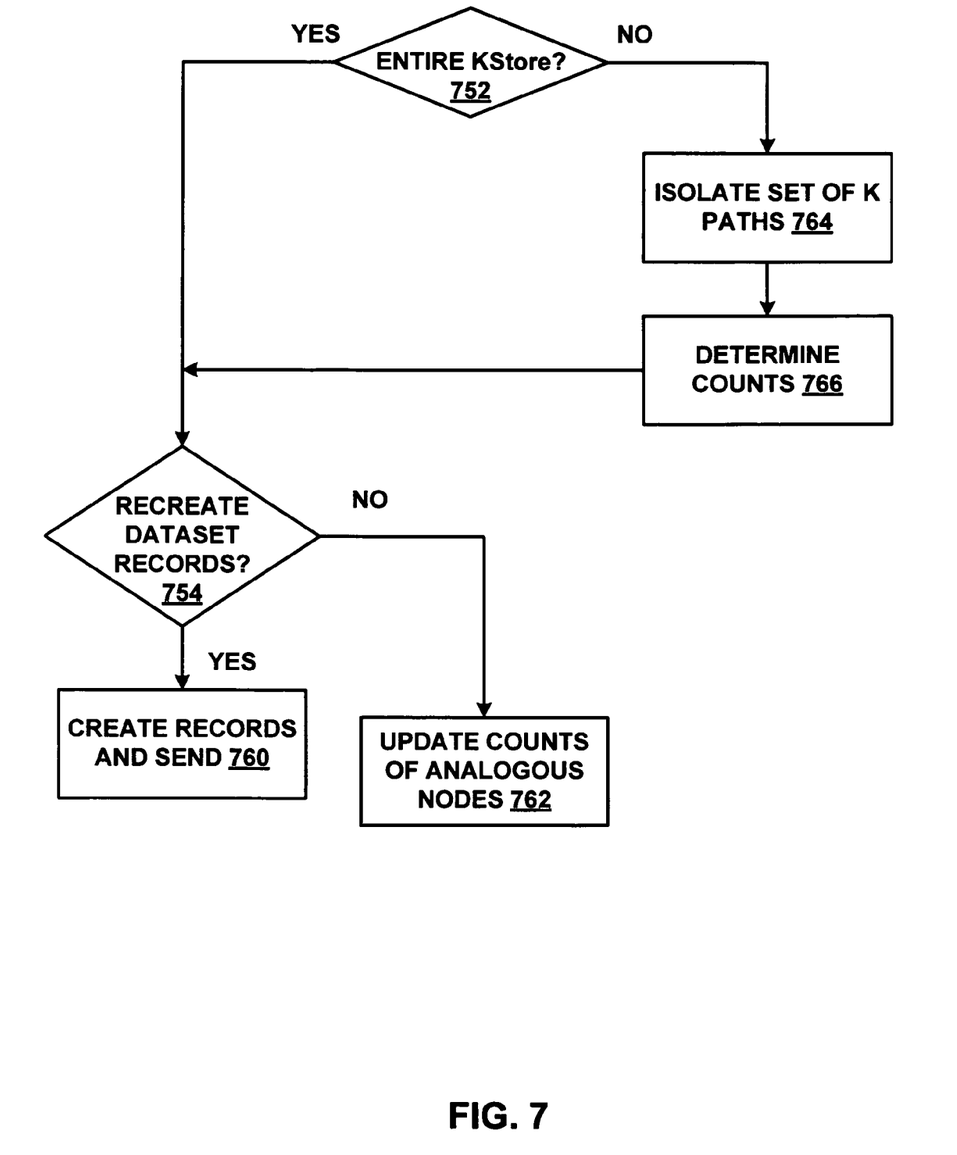
FIG. 7 is a flow diagram of a method for adding/subtracting KStores in accordance with aspects of the subject matter disclosed herein.

FIG. 7 is an example of a method 750 for up dating KStores in accordance with aspects of the subject matter disclosed herein. If it is determined at 752 that a portion of a KStore is to be used to update another KStore, processing continues at 764. If it is determined at 752 that an entire KStore is to be used to update another KStore, processing continues at 754. At 754, a determination is whether counts of analogous nodes are to be updated or whether a dataset of individual records is to be sent to the KStore being updated. At 760, in response to determining that a dataset of individual records is to be created, the dataset of individual records is created at 760 and sent to the KStore with an indication of whether the records in the dataset are to be added to or subtracted from the KStore to be updated. At 762, in response to determining at 756 that analogous nodes are to be updated, analogous nodes are updated as described above. If the KStore used to update the KStore being updated is to be added, the count of analogous nodes is summed. If the KStore used to update the KStore being updated is to be subtracted from the KStore being updated, the count of nodes in the updating KStore are subtracted from the analogous nodes in the KStore being updated, as described above. Structure is added or removed as needed, as described above.

At 764, in response to determining at 752 that a portion of the updating KStore is to be used to update the KStore being updated, the portion of the updating KStore to be used for updating is isolated at 764. Counts are determined for the nodes used for updating the KStore at 756. Processing then continues at 754 as described above.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

While the subject matter disclosed herein has been described in connection with the figures, it is to be understood that modifications may be made to perform the same functions in different ways. While innumerable uses for this invention may be found, and significant variability in the form and manner of operation of this invention are described and will occur to those of skill in these arts, the invention is not limited in scope further than as set forth in the following claims.

What is claimed is:

1. A computer-based system that updates KStores datastores within randomly accessible memory attached to the computer-based system, the system comprising:
    an engine for processing KStores, a KStore comprising an interlocking trees datastore comprising:
    a processor;
    elemental root nodes:
    subcomponent nodes; and
    end product nodes linked by asCase and asResult bi-directional links that create asCase and asResult paths within the interlocking trees datastore;
    wherein an asCase link represents a link to the first of the two nodes from which a node is created; and
    asResult link represents a link to the second of the two nodes from which a node is created;
    an asCase path comprises a sequence of subcomponent nodes linked with bi-directional asCase links ending with an end product node and where each subcomponent node in the asCase path has a bi-directional asResult link to an elemental root node or end product node comprising an asResult tree;
    the KStore processing engine updates an existing KStore to create an updated KStore by updating counts of analogous nodes based on the counts of the nodes in the updating KStore; and
    the portion of the updating KStore is isolated by following links of root nodes to subcomponent nodes, traversing an asCase path of the subcomponent node to an end product node of the asCase path, and determining a count associated with the isolated portion of the updating KStore.

2. The computer-based system of claim 1, wherein the engine creates individual dataset records and sends the individual dataset records to the KStore to be updated.

3. The computer-based system of claim 1, wherein a portion not comprising the entirety of the updating KStore is used to update the updated KStore.

4. The computer-based system of claim 1, wherein a count associated with nodes of the updated KStore analogous to nodes of the updating KStore are incremented by a count associated with the nodes of the updating KStore.

5. The computer-based system of claim 1, wherein a count associated with nodes of the updated KStore analogous to nodes of the updating KStore are decremented by a count associated with the nodes of the updating KStore.

6. The computer-based system of claim 1, wherein the KStore processing engine, in response to determining that the existing KStore does not include analogous nodes to nodes of the updating KStore, nodes analogous to nodes of the updating KStore are added to the updated KStore, the added nodes associated with a count equal to the count of the updating nodes.

7. The computer-based system of claim 1, wherein the KStore processing engine, in response to determining that a count associated with nodes of the updated KStore is zero or less than zero resulting from updating the updated KStore with the updating KStore, removes nodes of the updated KStore.

8. A computer implemented method for updating KStores datastores within randomly accessible memory attached to a computer-based system, the method comprising:
    determining counts of nodes in an updating KStore processed by a KStore computer, the determined counts associated with nodes used to update counts of analogous nodes of an updated KStore;
    updating the counts of the analogous nodes in the updated KStore,
    wherein a KStore comprises an interlocking trees datastore comprising:
        elemental root nodes;
        subcomponent nodes; and
        end product nodes linked by asCase and asResult bi-directional links that create asCase and asResult paths within the interlocking trees datastore;
    an asCase link represents a link to the first of the two nodes from which a node is created;
    asResult link represents a link to the second of the two nodes from which a node is created; and
    an asCase path comprises a sequence of subcomponent nodes linked with bi-directional asCase links ending with an end product node and where each subcomponent node in the asCase path has a bi-directional asResult link to an elemental root node or end product node comprising an asResult tree.

9. The computer implemented method of claim 8, wherein a portion of the updating KStore is used to update the updated KStore.

10. The computer implemented method of claim 9, further comprising:
    isolating the portion of the updating KStore to be used to update the updated KStore by following links of root nodes to subcomponent nodes, traversing an asCase path of the subcomponent node to an end product node of the asCase path.

11. The computer implemented method of claim 8, further comprising:
    creating a dataset of individual records from paths of the updating KStore.

12. The computer implemented method of claim 8, further comprising:
    updating counts of the analogous nodes in the updated KStore by adding the counts of the nodes in the updating KStore or by subtracting the counts of the nodes in the updating KStore.

13. The computer implemented method of claim 8, further comprising adding new nodes to the updated KStore or deleting nodes from the updated KStore.

14. A non-transitory computer-readable storage medium comprising computer-executable instructions that when executed, cause a computing environment to:
    update a first KStore datastore comprising an existing KStore datastore with a second KStore datastore comprising an updating KStore datastore to generate a third KStore datastore comprising an updated KStore datastore by updating counts of nodes in the updated KStore datastore, the nodes in the updated KStore datastore analogous to nodes in the updating KStore datastore;
    wherein a KStore datastore comprises an interlocking trees datastore comprising:
        elemental root nodes;
        subcomponent nodes; and
        end product nodes linked by asCase and asResult bi-directional links that create asCase and asResult paths within the interlocking trees datastore;
    an asCase link represents a link to the first of the two nodes from which a node is created; and
    asResult link represents a link to the second of the two nodes from which a node is created;
    an asCase path comprises a sequence of subcomponent nodes linked with bi-directional asCase links ending with an end product node and where each subcomponent node in the asCase path has a bi-directional asResult link to an elemental root node or end product node comprising an asResult tree.

15. The non-transitory computer-readable storage medium of claim 14, comprising further computer-executable instructions that when executed cause the computing environment to:
    add counts associated with the nodes in the updating KStore to the counts of analogous nodes in the updated KStore or subtract counts associated with the nodes in the updating KStore from the counts of analogous nodes in the updated KStore.

16. The non-transitory computer-readable storage medium of claim 15, comprising further computer-executable instructions that when executed cause the computing environment to:
    remove a node from the updated KStore in response to determining that a count of the node is zero or less than zero.

17. The non-transitory computer-readable storage medium of claim 15, comprising further computer-executable instructions that when executed cause the computing environment to:
    isolate a portion of an updating KStore to update the updated KStore by following links of elemental root nodes to subcomponent nodes, traversing an asCase path of the subcomponent node to an end product node of the asCase path.

18. The non-transitory computer-readable storage medium of claim 14, comprising further computer-executable instructions that when executed cause the computing environment to:
    add new paths to the updated KStore analogous to paths in the updating KStore in response to determining that a node in the updating KStore has no analogous node in the existing KStore.

19. The non-transitory computer-readable storage medium of claim 14, comprising further computer-executable instructions that when executed cause the computing environment to:
    update the updated KStore by sending individual records of a dataset created from the updating KStore to the existing KStore, wherein the individual records of the dataset are applied to the existing KStore to create the updated KStore; or
    update the updated KStore by sending individual records of a dataset created from a portion of the updating KStore to the existing KStore, wherein the individual records of the dataset are applied to the existing KStore to create the updated KStore.

* * * * *